(12) United States Patent
Alger et al.

(10) Patent No.: US 7,221,061 B2
(45) Date of Patent: May 22, 2007

(54) POWER GENERATION SYSTEM HAVING AN EXTERNAL PROCESS MODULE

(75) Inventors: Matthew J. Alger, Columbus, OH (US); Cho Y. Liang, West Lafayette, IN (US); Edward J. Woods, Germantown Hills, IL (US)

(73) Assignee: Caterpillar Inc, Peoria, IL (US)

( * ) Notice: Subject to any disclaimer, the term of this patent is extended or adjusted under 35 U.S.C. 154(b) by 220 days.

(21) Appl. No.: 10/307,882

(22) Filed: Dec. 2, 2002

(65) Prior Publication Data

US 2004/0104577 A1    Jun. 3, 2004

(51) Int. Cl.
F02B 63/04 (2006.01)
H02K 7/18 (2006.01)
F06K 15/00 (2006.01)
F02C 6/00 (2006.01)
F02C 6/18 (2006.01)

(52) U.S. Cl. ............................ 290/1 R; 290/1 A; 290/2

(58) Field of Classification Search ............... 290/1 A, 290/1 R, 1 C, 2; 123/2; 410/77, 46, 34, 410/35, 82

See application file for complete search history.

(56) References Cited

U.S. PATENT DOCUMENTS

| | | | | |
|---|---|---|---|---|
| 2,177,687 A | * | 10/1939 | Bracken et al. | 290/1 A |
| 2,961,549 A | * | 11/1960 | Shipitalo | 290/1 A |
| 3,536,928 A | * | 10/1970 | Jones, Jr. et al. | 290/1 B |
| 3,602,730 A | * | 8/1971 | Cushing | 307/150 |
| 3,714,449 A | * | 1/1973 | De Bella | 290/1 C |
| 3,791,682 A | * | 2/1974 | Mitchell | 290/2 |
| 3,980,185 A | * | 9/1976 | Cain | 206/509 |
| 4,082,052 A | * | 4/1978 | Looks | 410/82 |
| 4,128,769 A | * | 12/1978 | Bons et al. | 290/52 |
| 4,136,432 A | * | 1/1979 | Melley, Jr. | 29/469 |
| 4,221,515 A | * | 9/1980 | Brown et al. | 410/32 |
| 4,495,901 A | | 1/1985 | Pangano et al. | |
| 4,506,631 A | * | 3/1985 | Phong-Anant | 122/2 |
| 4,657,290 A | * | 4/1987 | Linden | 290/2 |
| 4,793,135 A | * | 12/1988 | Obstfelder et al. | 60/274 |
| 4,899,544 A | * | 2/1990 | Boyd | 60/618 |
| 4,992,669 A | * | 2/1991 | Parmley | 290/1 R |
| 4,993,125 A | * | 2/1991 | Capron et al. | 24/287 |
| 5,731,687 A | * | 3/1998 | Hirano et al. | 322/1 |
| 6,122,909 A | * | 9/2000 | Murphy et al. | 60/286 |
| 6,406,231 B1 | * | 6/2002 | Landoll et al. | 410/66 |
| 6,441,505 B1 | | 8/2002 | Branch et al. | |
| 6,601,542 B2 | * | 8/2003 | Campion | 123/2 |
| 6,765,304 B2 | * | 7/2004 | Baten et al. | 290/1 A |
| 6,871,504 B2 | * | 3/2005 | Kuroki et al. | 60/797 |

(Continued)

OTHER PUBLICATIONS

Jane's Freight Containers 1997, Jane's Yearbook, London XP002266393 p. 413, Para. 3—p. 414, para. 1.

Primary Examiner—Julio C. Gonzalez
(74) Attorney, Agent, or Firm—Liell & McNeil

(57) ABSTRACT

A power generation system includes a power module and an external process module. The external process module may include at least one engine support element. The power module has at least one connection zone, and the external process module has at least one connection zone that is configured to align with the at least one connection zone of the power module. The aligned connection zones of the power module and the external process module permit relatively quick and inexpensive attachment of the external process module to the power module. The at least one engine support element may be an aftertreatment element.

18 Claims, 4 Drawing Sheets

U.S. PATENT DOCUMENTS

2003/0030246 A1* 2/2003 Campion ................. 280/423.1
2004/0028495 A1* 2/2004 Tomkins et al. .............. 410/46
2006/0006652 A1* 1/2006 Witten et al. ............... 290/1 A

* cited by examiner

POWER GENERATION SYSTEM HAVING AN EXTERNAL PROCESS MODULE

TECHNICAL FIELD

This invention relates generally to power generation systems, and more particularly to an external process module for use with a power generation system.

BACKGROUND

In recent years regulatory agencies around the world have instituted changes in the regulations governing the emission levels of power generation systems. The changing of these regulations has resulted in many manufacturers of power generation systems producing aftertreatment systems to be added to their power generation systems. These aftertreatment systems reduce the levels of regulated emissions produced by the power generation systems. However, the process of adding the aftertreatment systems to the power generation systems has revealed several problems.

The typical process of attaching aftertreatment systems to power generation systems involves attaching individual elements of the aftertreatment system to the housing of the power generation system. However, a typical aftertreatment system includes several aftertreatment elements that each must be attached to the power generation system. Therefore, several laborers must travel to the site where the power generation system is located, determine the proper location for each aftertreatment element, prepare the power generation system for the attachment of the aftertreatment elements, attach each aftertreatment element to the power generation system, and connect the aftertreatment elements to each other and to the exhaust of the power generation system. This process is both time consuming and expensive.

When an aftertreatment system is to be added to a portable power generation system, other difficulties arise. The top sides of the housings of most portable power generation systems are not strong enough to support the weight of an aftertreatment system. Therefore, a typical procedure for attaching an aftertreatment system to a portable power generation system includes attaching supporting members to a side of the housing of the portable power generation system. These supporting members typically have one end welded to the base of the housing, a body that extends vertically up the side of the housing, and another end that extends above the top side of the housing. The aftertreatment elements are then attached to these members. Adding these supporting members to the housing increases the time and expense required to install the aftertreatment system.

Transportation problems are also inherent in the current method of adding aftertreatment systems to power generation systems. Individual aftertreatment elements are not easily transported via typical shipping methods. In addition, when supporting members are added to the housings of portable power generation systems, the supporting members add width and/or length to the housings. Therefore, these modified housings are often too large to be shipped via conventional means. In fact, special permits are often required to transport such modified housings on highways.

U.S. Pat. No. 4,992,669 issued to Parmley on Feb. 12, 1991 discloses a modular energy system in which a driven unit is connected to a driving unit via a shaft. These modular units are attached to each other via locking assemblies. However, the units that are shown in the '669 patent are each the same size. Stacking such units on top of each other could result in wind loads on the system of sufficient strength to cause damage to the system. In addition, the driven units in the '669 patent do not provide support for internal engine processes but merely use the power created by the driving units.

SUMMARY OF THE INVENTION

One embodiment of a power generation system has a power module and an external process module. The external process module has a frame and an engine support element attached to the frame. The external process module is connected to the power module.

Another embodiment of a power generation system has a power module and an external process module. The power module has a housing having a height dimension. The external process module has a frame having a height dimension. The height dimension of the frame of the external process module is less than the height dimension of the housing of the power module.

An external process module has a frame. The external process module also has at least one engine support element connected to the frame.

A method of assembling a power generation system includes providing a power module and providing an external process module. The external process module has a frame and at least one engine support element connected to the frame. The method further includes connecting the external process module to the power module.

DETAILED DESCRIPTION

Figure 1:
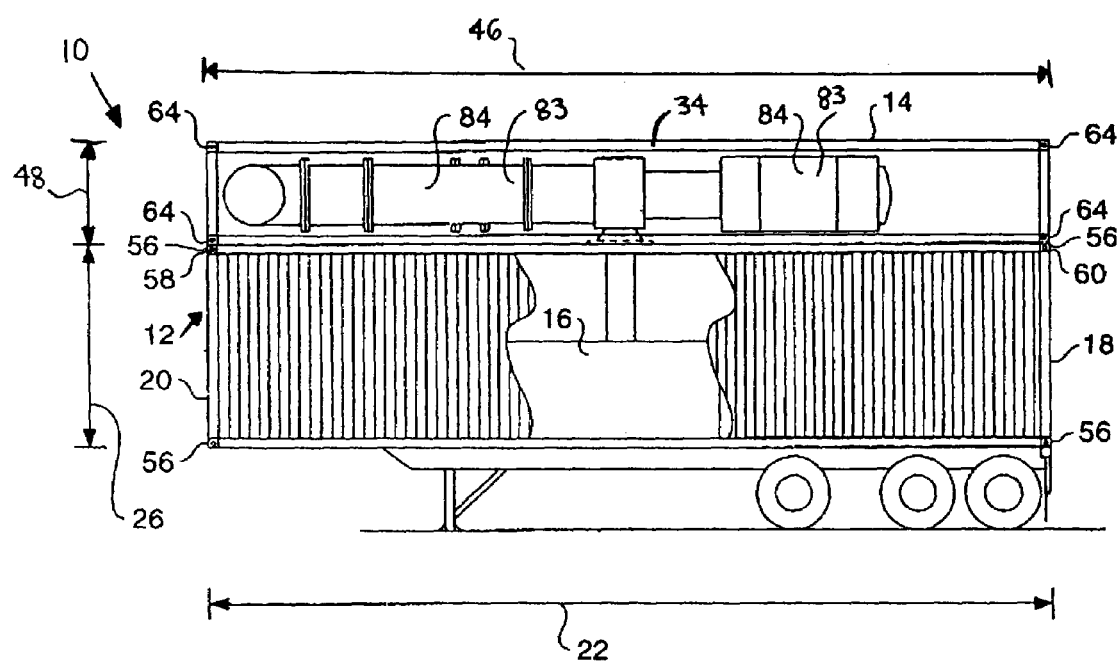
FIG. 1 is a side view of a power generation system having a power module and an external process module.

Referring to FIG. 1, a power generation system 10 is shown. The power generation system 10 includes a power module 12 and an external process module 14 connected to the power module 12. The power module 12 typically includes a power source 16. The power source 16 may be a spark-ignition engine, a compression-ignition engine, a homogenous charge compression ignition engine, a turbine, a fuel cell, or any other power-generating apparatus. As shown in FIG. 1, the power module 12 may be a portable power generation system. However, as used herein "power module" may also include other power generation systems, including custom-built power generation systems, fixed location power generation systems, and portable power generation systems that have been removed from trailers.

The power module 12 in FIG. 1 includes a housing 18 consisting of an ISO container 20. As used herein, "ISO container" shall mean a container meeting the specifications set forth by the International Standardization Organization. The housing 18 of the power module 12 in FIG. 1 consists of a 40-foot ISO container 20, having a length dimension 22 of approximately 40 feet, a width dimension 24, shown in FIG. 5, of approximately 8 feet, and a height dimension 26 of approximately 9.5 feet. However, ISO containers having other length dimensions, width dimensions, and height dimensions may be used as the power module housing 18. Examples of ISO container length dimensions include 20 feet, 30 feet, and 48 feet. Examples of ISO container height dimensions include 8 feet, 8.5 feet, 9 feet, and 9.5 feet. The housing 18 of the power module 12 may alternatively consist of other enclosures or of containers other than ISO containers.

Figure 2:
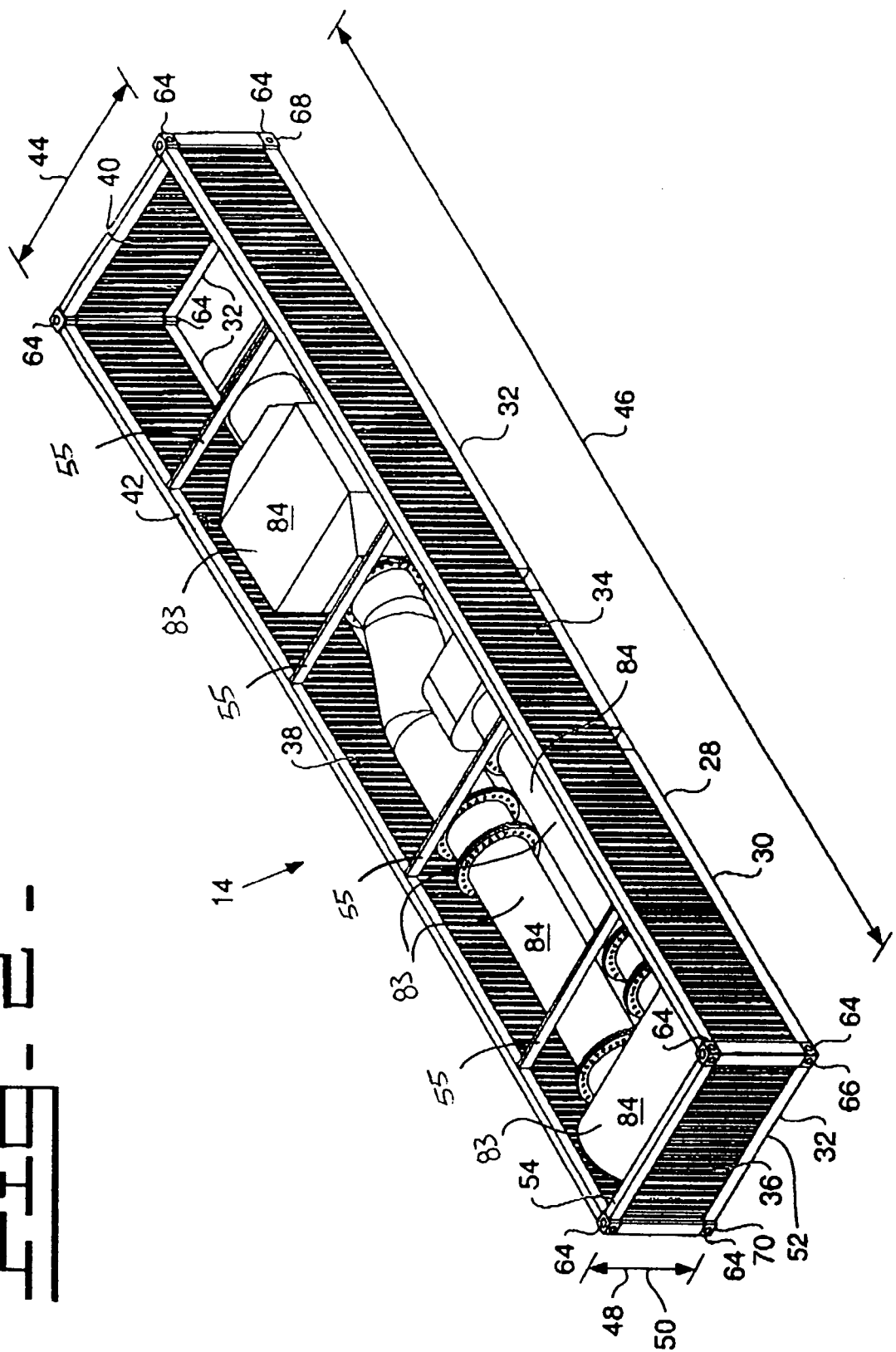
FIG. 2 is a perspective view of the external process module of FIG. 1.

As shown in FIG. 2, the external process module 14 has a frame 28. The frame 28 has a first side 30. In the embodiment in FIG. 2, the first side 30 of the frame 28 is formed by four members 32. However, in alternative embodiments, the first side 30 of the frame 28 could be formed by any other number of members 32 or by a single sheet. In the embodiment of FIG. 2, the frame 28 has a second side 34 connected to the first side 30. The frame 28 has a third side 36 connected to both the first side 30 and the second side 34. The frame 28 has a fourth side 38 connected to the first side 30 and the third side 36. The frame 28 has a fifth side 40 connected to the first side 30, the second side 34 and the fourth side 38. The frame 28 has a sixth side 42 connected to the second side 34, the third side 36, the fourth side 38 and the fifth side 40. In the embodiment of FIG. 2, the frame 28 is a cuboid. As used herein, the term "cuboid" shall mean "a shape having six sides wherein all the sides are squares or rectangles." However, the frame 28 may be of other shapes.

Figure 5:
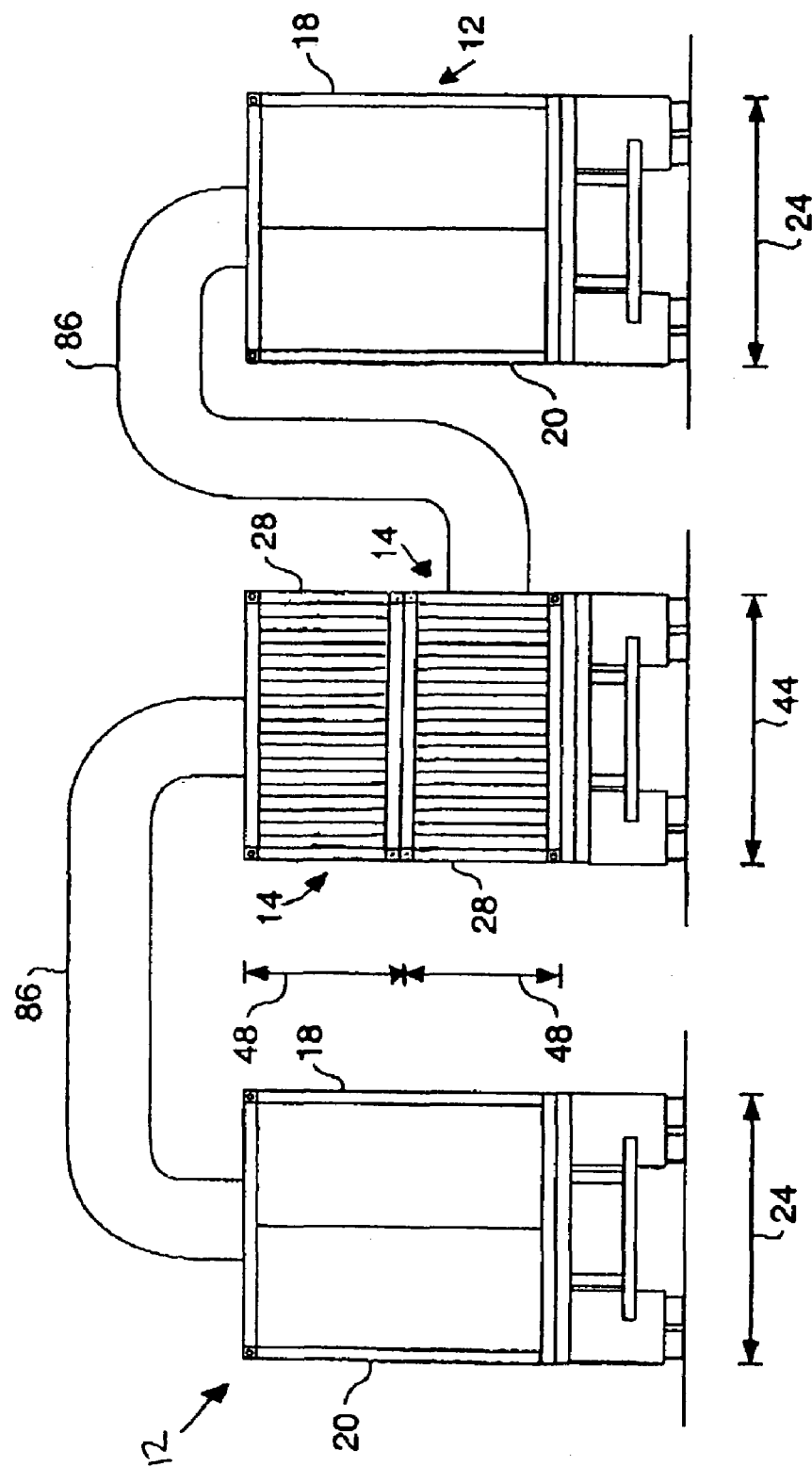
FIG. 5 is a rear view of an alternative embodiment of two power generation systems, each having a power module and an external process module.

In FIG. 2, the frame 28 has a width dimension 44. The width dimension 44 of the frame 28 may be approximately equal to a width dimension of an ISO container. For example, as shown in FIG. 5, the width dimension 44 of the frame 28 of the external process module 14 is approximately equal to the width dimension 24 of the power module housing 18. In the embodiment of FIG. 5, the power module housing 18 is an ISO container 20 having a width dimension 24 of 8 feet. In alternative embodiments, the width dimension 44 of the frame 28 may be approximately equal to the width dimension of ISO containers having width dimensions other than 8 feet or the width dimension of containers that are not ISO containers.

In FIG. 2, the frame 28 has a length dimension 46. The length dimension 46 of the frame 28 may be approximately equal to a length dimension of an ISO container. As shown in FIG. 1, frame 28 may have a footprint approximately equal to the footprint of an ISO container such that it may be transported via ISO compatible transport such as the trailer shown in FIG. 1, and/or stacked on top of other ISO containers as shown in the FIGS. For example, as shown in FIG. 1, the length dimension 46 of the frame 28 of the external process module 14 is approximately equal to the length dimension 22 of the power module housing 18. In the embodiment of FIG. 1, the power module housing 18 is an ISO container having a length dimension 22 of 40 feet. In other embodiments, the length dimension 46 of the frame 28 may be approximately equal to the length dimension of other ISO containers, including 20 feet, 30 feet and 40 feet. In alternative embodiments, the length dimension 46 of the frame 28 may be approximately equal to the length dimension of containers other than ISO containers.

In FIG. 2, the frame 28 has a height dimension 48. In FIG. 2, the height dimension 48 of the frame 28 is equal to a defined distance 50 between a first surface 52 and a second surface 54. The height dimension 48 of the frame 28 may be approximately equal to the height dimension of an ISO container. Alternatively, the height dimension 48 of the frame 28 may be less than the height dimension of an ISO container. For example, as shown in FIG. 1, the height dimension 48 of the frame 28 of the external process module 14 is approximately half the height dimension 26 of the ISO container 20 making up the power module housing 18. In the embodiment of FIG. 1, the power module housing 18 is an ISO container 20 having a height dimension of 9.5 feet. In other embodiments, the height dimension 48 of the frame 28 may be less than or approximately equal to the height dimension of other ISO containers, including 8 feet, 8.5 feet, and 9 feet. In alternative embodiments, the height dimension 48 of the frame 28 may be less than or approximately equal to the height dimension of containers other than ISO containers.

In alternative embodiments in which the frame 28 of the external process module 14 has only one side, e.g. the frame 28 consists of a sheet or members in a single plane, the second surface 54 is defined as a top surface of the sheet or a top surface of the highest member. Therefore, the height dimension 48 of the frame 28 is equal to the thickness of the sheet or the distance between a bottom surface of the lowest member and the top surface of the highest member.

In the embodiment of FIG. 1, the second side 34 of the external process module frame 28 is open. In other embodiments any number of sides 30, 34, 36, 38, 40, and 42 may be open. In the embodiment of FIG. 2, the second side 34, third side 36, fourth side 38, and fifth side 40 of the external process module frame 28 are covered with corrugated sheeting. In addition, the sixth side 42 includes structural support members 55. Other embodiments of the external process module 14 may have corrugated sheeting and/or structural support members 55 on one or more sides 30, 34, 36, 38, 40 and 42. Alternative embodiments of the external process module 14 may have other materials covering one or more sides, 30, 34, 36, 38, 40, and 42, of the external process module 28, including uncorrugated metal sheeting.

Figure 3:
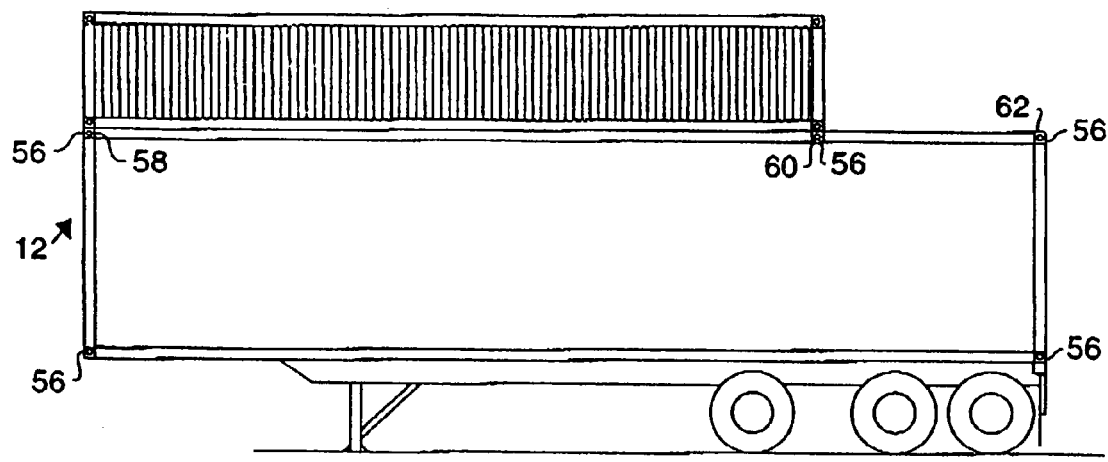
FIG. 3 is a side view of an alternative embodiment of a power generation system having a power module and an external process module.

As shown in FIG. 1, the power module 12 has at least one connection zone 56. Although only four connection zones 56 are visible in FIG. 1, the embodiment of the power module 12 in FIG. 1 has eight connection zones 56, each located on a corner of the power module housing 18. A first connection zone 58 is spaced from a second connection zone 60 by approximately 20 feet. In alternative embodiments, the first connection zone 58 may be spaced from the second connection zone 60 by approximately 30 feet, approximately 40 feet, or approximately 48 feet. Alternative embodiments of power modules 12 may have different numbers or placements of connection zones 56. For example, in the embodiment of FIG. 3, the power module 12 has ten connection zones 56. In FIG. 3, the second connection zone 60 is spaced 40 feet from the first connection zone 58, and a third connection zone 62 is spaced 48 feet from the first connection zone 58.

As shown in FIG. 1, the external process module 14 has at least one connection zone 64 configured to align with the at least one connection zone 56 of the power module 12. In the embodiment in FIG. 2, the external process module 14 has 8 connection zones 64, each located on a corner of the frame 28. A first connection zone 66 is spaced from a second connection zone 68 by approximately 20 feet. In alternative embodiments, the first connection zone 66 may be spaced from the second connection zone 68 by approximately 30 feet, approximately 40 feet, or approximately 48 feet. In the embodiment of FIG. 2, the first connection zone 66 is spaced from a third connection zone 70 by approximately 8 feet.

Alternative embodiments of external process modules 14 may have different numbers or placements of connection zones 64.

Figure 4:
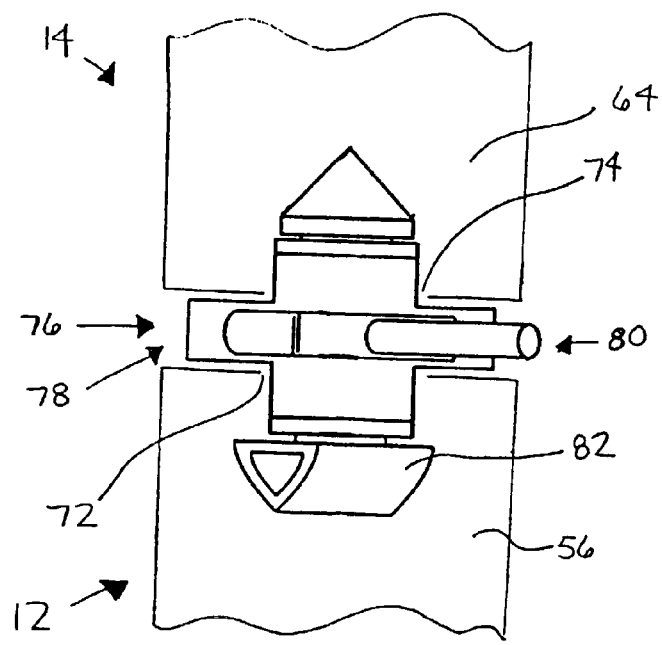
FIG. 4 is an enlarged sectional view of a connection zone of the power module of any of FIGS. 1–3 and a connection zone of the external process module of any of FIGS. 1–3.

FIG. 4 shows one embodiment of a power module connection zone 56 and an external process module connection zone 64. In the embodiment of FIG. 4, the power module connection zone 56 has at least one orifice 72, and the external process module connection zone 64 has at least one orifice 74. A means 76 for removably connecting the external process module 14 to the power module 12 is configured to engage the power module connection zone 56 and the external process module connection zone 64. In the embodiment of FIG. 3, the means 76 is a fastener 78, and the fastener 78 is a locking assembly 80. The locking assembly 80 has at least one rotatable member 82. The at least one rotatable member has a first position that enables the rotatable member to fit within either the at least one orifice 74 of the external process module connection zone 64 or the at least one orifice 72 of the power module connection zone 56. The at least one rotatable member has a second position that prevents the rotatable member from being inserted or removed from either the at least one orifice 74 of the external process module connection zone 64 or the at least one orifice 72 of the power module connection zone 56.

Power module connection zones 56 and external process module connection zones 64 may be of alternative configurations. For example, such connection zones, 56 and 64, may be reinforced areas of the power module housing 18 or external process module frame 28, respectively. Additionally, the connection zones, 56 and 64, may be connected by one or more of several types of fasteners 78, including bolts, screws, pins, rivets, dowels, latches and studs. If quick removal of the external process module 14 from the power module 12 is not required, the external process module 14 may be more permanently attached to the power module 12, such as by welding.

In the embodiments of FIG. 1 and FIG. 2, the external process module 14 has at least one engine support element 83 connected to the frame 28. As used herein, the term "engine support element" shall mean a device or apparatus useful in supporting an internal process of the power source 16 or useful in treating an emission from the power source 16. Examples of engine support elements include heat recovery elements, cooling elements, turbocharger elements, air intake elements, exhaust system elements, fuel storage elements, and aftertreatment elements. In the embodiments of FIG. 1 and FIG. 2, the at least one engine support element is an aftertreatment element. The aftertreatment element 84 may be any of a catalytic NOx reduction device, a muffler, a urea injection module, an emissions monitoring device, a urea tank, an air compressor, an oxidation catalyst, a particulate trap, ductwork, or any other device or apparatus useful in the process of reduction of an emission from the power source 16 or the process of removal of a certain substance from an exhaust of the power source 16.

INDUSTRIAL APPLICABILITY

The embodiment of the power system 10 of FIG. 1 is assembled by lifting the external process module 14 onto the power module 12. The external process module 14 is then connected to the power module 12. One method of connecting the external process module 14 to the power module 12 includes connecting the frame 28 to the power module 12. This may be accomplished by aligning at least one connection zone 64 of the external process module 14 with at least one connection zone 56 of the power module 12. Then at least one connection zone 64 of the external process module 14 is connected with at least one connection zone 56 of the power module 12 by at least one fastener 78, such as the locking assembly 80 of FIG. 4. Other fasteners 78 may be used to connect the external process module 14 to the power module 12, or the external process module 14 may be more permanently attached to the power module 12, such as by welding.

In the embodiment of FIG. 4, the at least one rotatable member 82 of the locking assembly 80 is placed in the first position. The at least one rotatable member 82 is then inserted into either the at least one orifice 72 of the power module 12 or the at least one orifice 74 of the external process module 14. The at least one rotatable member 82 is then placed into the second position, thereby preventing the at least one rotatable member from being removed from either the at least one orifice 72 of the power module 12 or the at least one orifice 74 of the external process module 14. The power module 12 is thus connected to the external process module 14.

The external process module 14 may be connected to areas of the power module 12 other than that shown in FIG. 1. For example, the external process module 14 may be attached to a different side of the power module 12. In another embodiment of the power system 10, shown in FIG. 5, the frame 28 of the external process module 14 is not directly attached to the power module 12. As shown in FIG. 5, the external process module 14 is connected to the power module 12 via the aftertreatment ductwork 86.

The at least one aftertreatment element 84 of the external process module 14 of FIG. 1 is connected to the power module 12 such that exhaust from the power source 16 is directed into the at least one aftertreatment element 84. In one alternative embodiment, the at least one fuel storage element of the external process module 14 is connected to the power module 12 such that the fuel stored in the fuel storage element is supplied to the power source 16. In another alternative embodiment, the at least one heat recovery element of the external process module 14 is positioned such that the at least one heat recovery element can recover heat produced by the power source 16. In another alternative embodiment, the at least one cooling element is positioned such that a fluid heated by the power module 12 is cooled by the at least one cooling element.

The embodiments of external process modules 14 that have length dimensions 46, width dimensions 44 and height dimensions 48 approximately equal to those of ISO containers may be transported in the same ways as ISO containers, including cargo ships, trains, or trailers pulled by on-highway trucks. Those embodiments of external process modules 14 with height dimensions 48 that are approximately half the height dimensions of ISO containers may offer an additional benefit, as shown in FIG. 5. Two or more external process modules 14 may be connected together and transported in the same space as one ISO container 20. Therefore, two such external process modules 14 may be transported on one trailer, reducing transportation expenses.

Those external process modules 14 that have height dimensions 48 less than the height dimensions 26 of the power modules 12 to which they are attached may provide an additional benefit. When attached to power modules 12, the smaller surface area of such external process modules 14 results in wind forces on the power system 10 that are less than the wind forces on power systems 10 having external process modules 14 with larger height dimensions 26. Therefore, the risk that the power system 10 will suffer wind damage is reduced by utilizing external process modules 14 with lesser height dimensions 26.

A power system 10 having an external process module 14 may have other benefits over power systems 10 having aftertreatment elements 84 individually attached to the power module 12. The external process module 14 can typically be attached to the power module 12 without making modifications to the power module 12, such as welding supporting members to the side of the power module 12. Therefore, if the power system 10 needs to be moved, the external process module 14 may be easily removed from the power module 12 and the power module 12 may be transported via standard shipping methods. The time and expense of obtaining special permits to transport modified power modules 12 can be avoided. Also, external process modules 14 that are attached to power modules 12 via locking assemblies 80, such as those in FIG. 3, are quicker and cheaper to install upon and remove from power modules 12 than individual aftertreatment elements 84. In addition, external process modules 14 may be easily transferred from one power module 12 to another. For example, if a power module 12 needs to be repaired or replaced, the external process module 14 from the defective power module 12 may likely be removed and attached to the replacement power module 12.

Other aspects, objects, and advantages of this invention can be obtained from a study of the drawings, the disclosure, and the appended claims.

What is claimed is:

1. A power generation system comprising:
   a power module having a plurality of corners and
   an external process module separate from said power module, said external process module housed within a rectangular frame with at least two corners vertically aligned with an equal number of said plurality of corners, and including at least one engine support element, comprising an aftertreatment element having an emissions treating apparatus, connected to said frame, said external process module removably connected to said power module and being configured to reduce or remove a substance from an exhaust of said power module via said aftertreatment element;
   wherein said power module has a rectangular housing, said housing having a height dimension and a width dimension;
   said frame of said external process module has unequal height, length and width dimensions, said height dimension of the frame of said external process module being less than said height dimension of the housing of said power module and the width dimension of the frame of said external process module being approximately equal to the width dimension of the housing of said power module; and
   four corners of said external process module vertically align with four corners of said power module.

2. The power generation system of claim 1 wherein said external process module is sized and shaped to be stacked on an international standardization organization container, said emissions treating apparatus comprises at least one of, a catalytic NOx reduction device, an oxidation catalyst, an emissions monitoring device, a urea tank, a urea injection module, and a particulate trap.

3. A power generation system comprising:
   a power module having a plurality of corners and
   an external process module separate from said power module, said external process module housed within a rectangular frame with at least two corners vertically aligned with an equal number of said plurality of corners, and including at least one engine support element, comprising an aftertreatment element having an emissions treating apparatus, connected to said frame, said external process module removably connected to said power module and being configured to reduce or remove a substance from an exhaust of said power module via said aftertreatment element;
   wherein said frame has a width dimension and a length dimension approximately equal to a corresponding dimension of an international standardization organization container;
   wherein said power module has a rectangular housing, said housing having a height dimension and a width dimension;
   said frame of said external process module has unequal height, length and width dimensions, said height dimension of the frame of said external process module being less than said height dimension of the housing of said power module and the width dimension of the frame of said external process module being approximately equal to the width dimension of the housing of said power module; and
   four corners of said external process module vertically align with four corners of said power module.

4. The power generation system of claim 3 wherein said emissions treating apparatus comprises at least one of, a catalytic NOx reduction device, an oxidation catalyst, an emissions monitoring device, a urea tank, a urea injection module, and a particulate trap.

5. The power generation system of claim 3 wherein said power module has at least one connection zone and said external process module has at least one connection zone configured to vertically align with said at least one connection zone of said power module, said system further comprising a separate fastener interconnecting the power module to the process module at each connection zone and configured to engage each of the respective connection zones.

6. The power generation system of claim 3 wherein
   said power module includes a plurality of connection zones and said external process module includes a plurality of connection zones;
   said plurality of connection zones of said external process module includes a first connection zone and a second connection zone spaced a defined distance relative to a length dimension of said external process module from said first connection zone and at least a third connection zone spaced a defined distance relative to a width dimension of said external process module from said first connection zone; and
   said plurality of connection zones of said power module includes at least three connection zones configured to align one with each of the first, second and third connection zones of said external process module.

7. The power generation system of claim 3 wherein
   said power module has at least one connection zone and said external process module has at least one connection zone configured to align with said at least one connection zone of said power module;
   said system further including a fastener connecting said at least one connection zone of said power module with said at least one connection zone of said external process module; and
   said fastener is a locking assembly having at least one rotatable member and is configured to engage with each of said at least one connection zones of said power module and said external process module.

8. The power generation system of claim 3 wherein said exhaust aftertreatment element comprises an oxidation catalyst, a urea tank, a muffler and an air compressor.

9. The power generation system of claim 3 wherein said height dimension of said frame is approximately half of said height dimension of said power module.

10. The power generation system of claim 3 wherein said external process module includes a connection with said power module via exhaust aftertreatment ductwork.

11. An external process module comprising:
a frame having a rectangular bottom side defining an international standardization organization container footprint;
at least one engine support element housed within said frame, said at least one engine support element comprising an aftertreatment element that includes an emissions treating apparatus configured to reduce or remove a substance from exhaust within said external process module; and
means, including a fastener with a locking/unlocking assembly, for removably coupling the support element to an exhaust duct of a power module; and
the external process module being connectable to another external process module in a stacking configuration that includes vertically aligned corners.

12. The external process module of claim 11 wherein said frame has a height dimension that is less than a height dimension of an international standardization organization container.

13. A plurality of removably connected external process modules including at least two external process modules being in contact and stacked one on top of the other with vertically aligned corners; and each external process module comprising:
a frame having a rectangular bottom side defining an international standardization organization container footprint;
at least one engine support element housed within said frame, said at least one engine support element comprising an aftertreatment element that includes an emissions treating apparatus configured to reduce or remove a substance from exhaust within said external process module; and
means, including a fastener with a locking/unlocking assembly, for removably coupling the support element to a power module.

14. The plurality of removably connected external process modules of claim 13 wherein said at least two stacked external process modules are sized and shaped to occupy the space of one international standardization organization container.

15. A method of assembling a power generation system comprising:
separately transporting an external process module and a power module to a location;
vertically aligning at least two corners of the external process module with an equal number of corners of at least one of the power module and a second external process module;
positioning the external process module in contact with at least one of the power module and the second external process module; and
connecting the external process module with the at least one of the power module and the second external process module at least in part by moving a fastener locking assembly; and
connecting an emissions treating apparatus of the external process module with the power module.

16. The method of claim 15 wherein the positioning step comprises stacking the external process module on top of one of, the power module and the second external process module.

17. The method of claim 16 wherein the transporting step comprises transporting the external process module via international standardization organization compatible transport, and wherein the step of connecting an emissions treating apparatus of the external process module with the power module further comprises connecting at least one of, a catalytic NOx reduction device, an oxidation catalyst, an emissions monitoring device, a urea tank, a urea injection module, and a particulate trap with the power module.

18. The method of claim 17 wherein the step of connecting the external process module with the power module comprises connecting the external process module to the power module via exhaust aftertreatment ductwork, the method further comprising a step of decoupling the external process module from the at least one of the power module and a second external process module prior to connecting the external process module to the power module via exhaust aftertreatment ductwork.

* * * * *

UNITED STATES PATENT AND TRADEMARK OFFICE
CERTIFICATE OF CORRECTION

PATENT NO.        : 7,221,061 B2                                              Page 1 of 1
APPLICATION NO.   : 10/307882
DATED             : May 22, 2007
INVENTOR(S)       : Alger et al.

It is certified that error appears in the above-identified patent and that said Letters Patent is hereby corrected as shown below:

In Column 3, Line 56, after "container" insert -- 20 --.

Signed and Sealed this

Twenty-fourth Day of June, 2008

JON W. DUDAS
*Director of the United States Patent and Trademark Office*